US012603193B2

(12) United States Patent
Fukushima et al.

(10) Patent No.: US 12,603,193 B2
(45) Date of Patent: Apr. 14, 2026

(54) WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Daichi Fukushima, Mie (JP); Hiroki Hirai, Mie (JP); Housei Mizuno, Mie (JP); Miyu Aramaki, Mie (JP); Tetsuya Nishimura, Mie (JP); Junichi Shirakawa, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/760,687

(22) Filed: Jul. 1, 2024

(65) Prior Publication Data

US 2024/0355503 A1 Oct. 24, 2024

Related U.S. Application Data

(63) Continuation of application No. 17/420,006, filed as application No. PCT/JP2019/000706 on Jan. 11, 2019, now abandoned.

(51) Int. Cl.
| | |
|---|---|
| *H01B 7/08* | (2006.01) |
| *B60R 16/02* | (2006.01) |
| *H01B 7/00* | (2006.01) |

(52) U.S. Cl.
CPC ....... *H01B 7/0045* (2013.01); *B60R 16/0215* (2013.01); *H01B 7/0846* (2013.01)

(58) Field of Classification Search
CPC ...... H01B 7/0045; H01B 7/08; H01B 7/0846; H02G 3/04; H02G 3/30; H02G 3/305; B60R 6/0207; B60R 6/0215
See application file for complete search history.

(56) References Cited

U.S. PATENT DOCUMENTS

| | | |
|---|---|---|
| 2013/0180777 A1 | 7/2013 | Shibata |
| 2014/0283989 A1 | 9/2014 | Takano |
(Continued)

FOREIGN PATENT DOCUMENTS

| | | |
|---|---|---|
| CN | 207926422 U | 9/2018 |
| JP | H05-207628 | 8/1993 |
(Continued)

OTHER PUBLICATIONS

International Search Report issued in International Patent Application No. PCT/JP2019/000706, dated Mar. 12, 2019, along with an English translation thereof.
(Continued)

*Primary Examiner* — Paresh Paghadal
(74) *Attorney, Agent, or Firm* — Greenblum & Bernstein, P.L.C.

(57) ABSTRACT

A wiring member includes a sheet material including a first layer formed into a sheet-like shape and a second layer provided on a main surface of the first layer, and a wire-like transmission member fixed on the sheet material. The second layer is a layer mediating a bonding of the first layer and the wire-like transmission member, and includes a plurality of partial second layers provided to be separated from each other along an extension direction of the wire-like transmission member.

20 Claims, 4 Drawing Sheets

(56)          References Cited

U.S. PATENT DOCUMENTS

| | | | |
|---|---|---|---|
| 2016/0039367 A1 | 2/2016 | Yoshida | |
| 2017/0327060 A1* | 11/2017 | Nakajima | ........ H01B 13/01254 |
| 2018/0015689 A1 | 1/2018 | Takata | |
| 2020/0062198 A1 | 2/2020 | Mizushita et al. | |
| 2020/0139906 A1 | 5/2020 | Mizuno | |
| 2020/0172027 A1 | 6/2020 | Mizuno et al. | |
| 2021/0309168 A1 | 10/2021 | Kisu | |
| 2021/0309169 A1 | 10/2021 | Kisu | |

FOREIGN PATENT DOCUMENTS

| | | |
|---|---|---|
| JP | 08-315641 | 11/1996 |
| JP | 9-115346 | 5/1997 |
| JP | H11-308741 | 11/1999 |
| JP | 2004-273369 | 9/2004 |
| JP | 2004-320956 | 11/2004 |
| JP | 2013-98065 | 5/2013 |
| JP | 2015-053262 | 3/2015 |
| JP | 2016-9521 | 1/2016 |
| JP | 6365704 | 8/2018 |
| JP | 2019-003925 | 1/2019 |
| WO | 2018/207695 | 11/2018 |

OTHER PUBLICATIONS

International Preliminary Report on Patentability issued in International Patent Application No. PCT/JP2019/000706, dated Jul. 22, 2021, along with an English translation thereof.

Japan Office Action issued in Japan Patent Application No. 2020-565552, dated Feb. 8, 2022, together with English translation thereof.

China Office Action issued in China Patent Application No. 201980087826.7, dated May 9, 2022, together with English translation thereof.

Japan Office Action issued in Japan Patent Application No. 2020-565552, dated Aug. 9, 2022, together with English translation thereof.

China Office Action issued in China Patent Application No. 201980087826.7, dated Oct. 9, 2022, together with English translation thereof.

China Office Action issued in China Patent Application No. 201980087826.7, dated Mar. 26, 2023, together with English translation thereof.

Japan Office Action issued in Japan Patent Application No. 2022-177878, dated Aug. 22, 2023, together with English translation thereof.

Japan Office Action issued in Japan Patent Application No. 2023-180959, dated Jul. 23, 2024, together with English translation thereof.

Decision of Refusal issued in Japan Patent Application No. 2023-180959, dated Dec. 17, 2024, together with English translation thereof.

* cited by examiner

F I G . 1
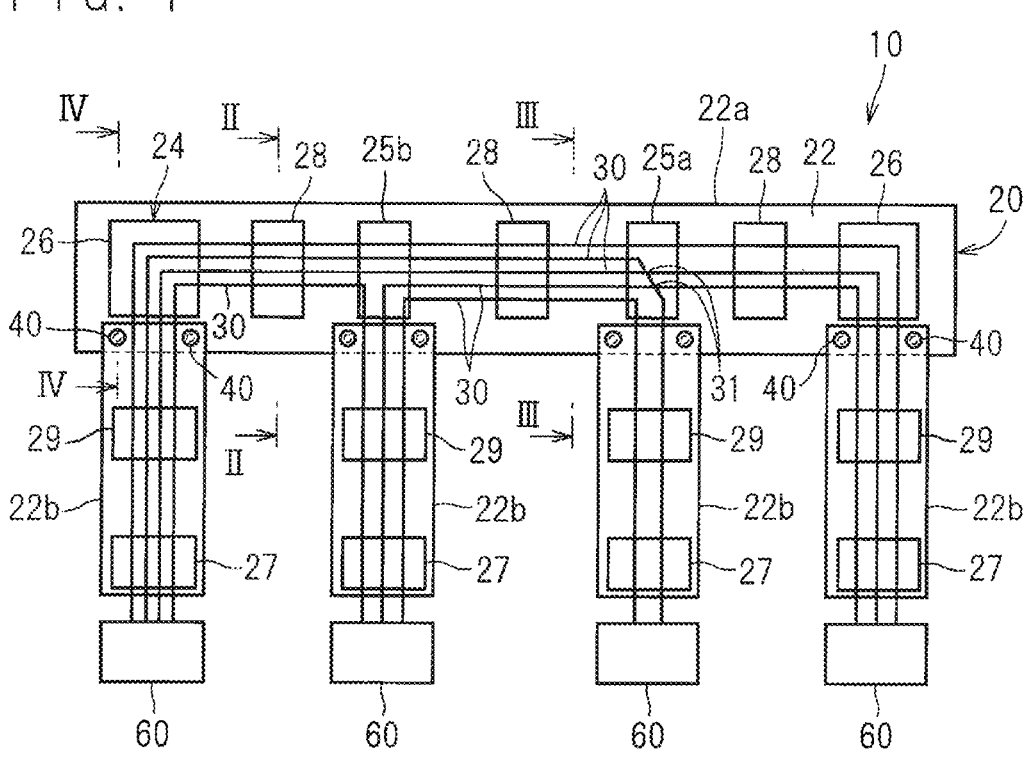
F I G . 2
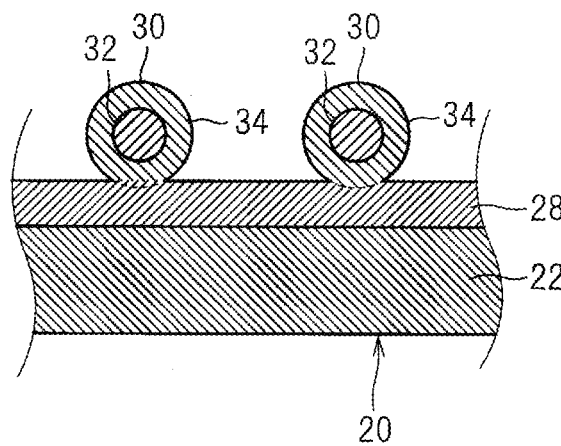

F I G . 3
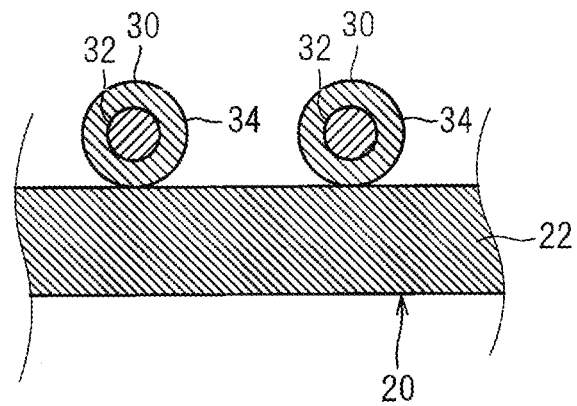
F I G . 4
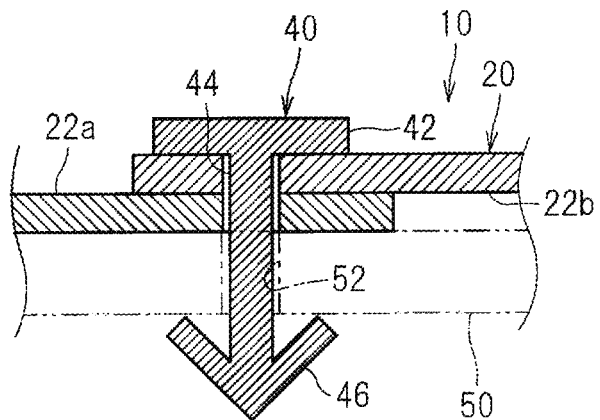

F I G. 5
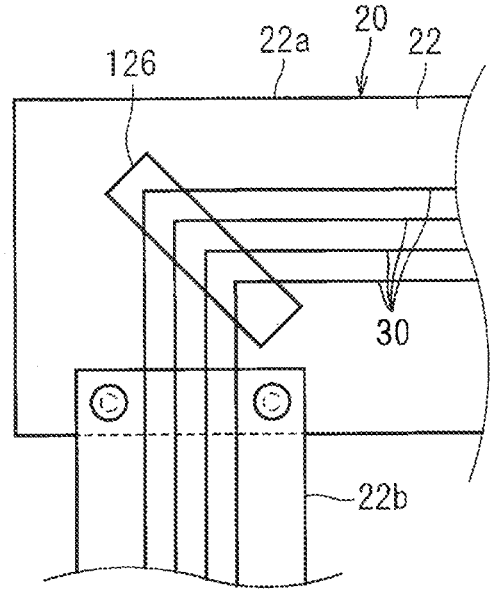
F I G. 6
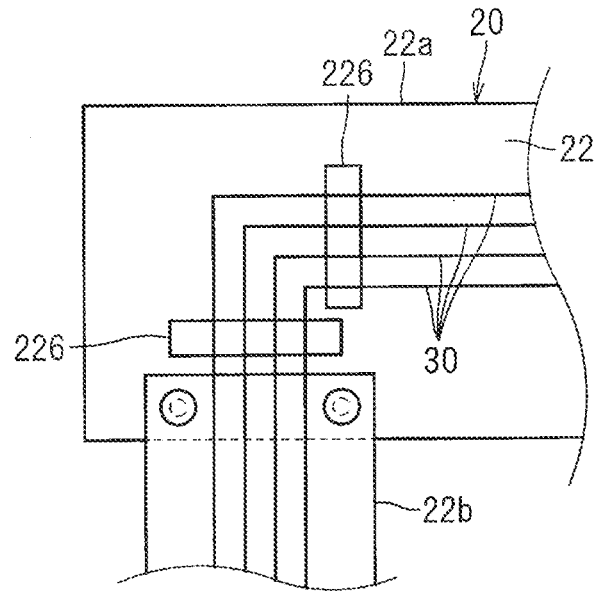

F I G .  7
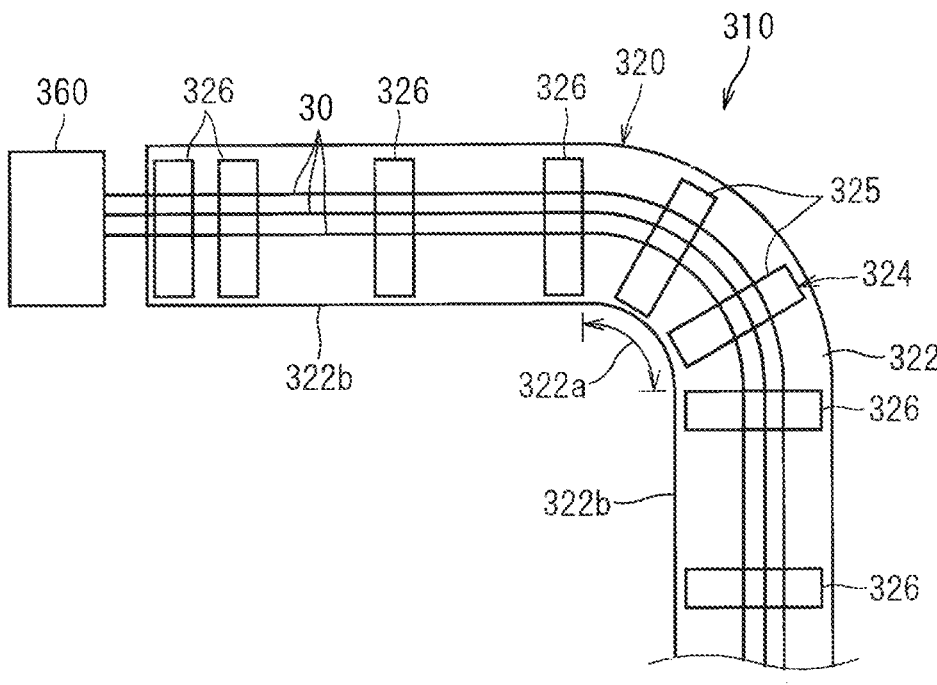
F I G .  8
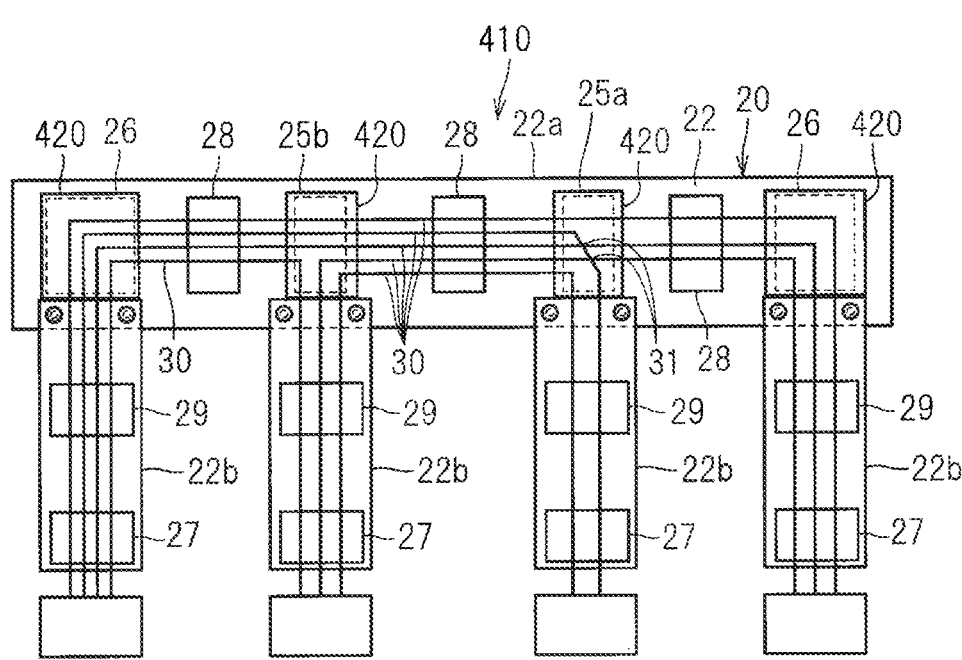

WIRING MEMBER

CROSS-REFERENCE TO RELATED APPLICATIONS

The present application is a Continuation Application of U.S. application Ser. No. 17/420,006, filed Jun. 30, 2021, which is a national stage application under 35 U.S.C. § 371 of PCT Patent Application No. PCT/JP2019/000706, filed Jan. 11, 2019, the disclosures of which are incorporated by reference herein in their entireties.

TECHNICAL FIELD

The present invention relates to a wiring member.

BACKGROUND ART

Patent Document 1 discloses a wire harness including an exterior member formed into a sheet-like shape and an electrical wire disposed to overlap with the exterior member in at least part of a region along an extension direction, wherein at least part of a portion where an insulating covering of the electrical wire and the exterior member overlap each other is welded.

PRIOR ART DOCUMENTS

Patent Documents

Patent Document 1: Japanese Patent No. 6365704

SUMMARY

Problem to be Solved by the Invention

There is a possibility that sufficient fixing strength cannot be obtained when a material of the insulating covering of the electrical wire and a material of the exterior member are not compatible with each other or a welding area is small. In this case, a holding part mediating a bonding of the exterior member and the insulating covering of the electrical wire by welding is considered to be provided on a main surface of the exterior member.

However, in this case, if the holding part is provided on the whole main surface of the exterior member, quantity and cost for materials increase.

Accordingly, an object of the present invention is to be able to fix a wire-like transmission member to a sheet material as firmly as possible while reducing a weight and cost for materials of the wiring member.

Means to Solve the Problem

In order to solve the above problem, a wiring member according to a first aspect includes: a sheet material including a first layer formed into a sheet-like shape and a second layer provided on a main surface of the first layer; and a wire-like transmission member fixed on the sheet material, wherein the second layer is a layer mediating a bonding of the first layer and the wire-like transmission member, and includes a plurality of partial second layers provided to be separated from each other along an extension direction of the wire-like transmission member.

A second aspect is the wiring member according to the first aspect, wherein the wire-like transmission member includes a plurality of wire-like transmission members fixed in a branch state on the sheet material, and the plurality of partial second layers include a layer provided in a region keeping a state where the plurality of wire-like transmission members are branched.

A third aspect is the wiring member according to the second aspect, wherein the plurality of partial second layers include a layer provided in a region where the plurality of wire-like transmission members are bended in a branch part of the wire-like transmission members.

A fourth aspect is the wiring member according to any one of the first to third aspects, wherein the plurality of partial second layers include a layer provided in a region where the plurality of wire-like transmission members intersect with each other.

A fifth aspect is the wiring member according to any one of the first to fourth aspects, wherein at least part of the wire-like transmission member is fixed on the sheet material in a bended state, and the plurality of partial second layers include a layer provided in a region keeping a state where the wire-like transmission member is bended.

A sixth aspect is the wiring member according to the fifth aspect, wherein the plurality of partial second layers include a layer provided in a region where the wire-like transmission member is bended.

A seventh aspect is the wiring member according to the fifth or six aspect, wherein the plurality of partial second layers include layers provided on both sides of a position where the wire-like transmission member is bended.

An eighth aspect is the wiring member according to any one of the first to seventh aspects, wherein the plurality of partial second layers include a layer provided in a terminal portion of the sheet material.

A ninth aspect is the wiring member according to any one of the first to eighth aspects, wherein intervals between the plurality of partial second layers in a direction along an extension direction of the wire-like transmission member are different.

A tenth aspect is the wiring member according to any one of the first to ninth aspects, wherein lengths of the plurality of partial second layers in a direction along an extension direction of the sheet material are different.

An eleventh aspect is the wiring member according to any one of the first to tenth aspects, wherein the partial second layers include a layer protruding to a lateral side of the wire-like transmission member to be provided on a main surface of the first layer, and the wiring member further comprises a cover attached to the sheet material to cover at least part of the wire-like transmission member via portions of the partial second layers provided to protrude to a lateral side of the wire-like transmission member.

Effects of the Invention

According to the first aspect, the wire-like transmission member can be fixed to the sheet material as firmly as possible by the second layer. The second layer includes a plurality of partial second layers provided to be separated from each other along an extension direction of the wire-like transmission member, thus a weight and cost for materials of the wiring member can be reduced compared with a case where the second layer is provided on the whole main surface of the sheet material.

According to the second aspect, the partial second layer can keep the state where the plurality of wire-like transmission members are branched, thus the wire-like transmission member can be effectively fixed to the sheet material.

According to the third aspect, the partial second layer can keep the state where the plurality of wire-like transmission members are bended in a branch part of the wire-like transmission members.

According to the fourth aspect, the partial second layer can keep the state where the plurality of wire-like transmission members intersect with each other.

According to the fifth aspect, the partial second layer can keep the state where the wire-like transmission member is bended.

According to the sixth aspect, the partial second layer can keep the state where the wire-like transmission member is bended.

According to the seventh aspect, the partial second layer can keep the state where the wire-like transmission member is bended.

According to the eighth aspect, the partial second layer can firmly hold the wire-like transmission member in the terminal portion of the sheet material.

According to the ninth aspect, the intervals between the plurality of partial second layers are changed in accordance with the preferable fixing strength, thus the wire-like transmission member can be fixed to the sheet material as firmly as possible, and a weight and cost for materials of the wiring member can be reduced.

According to the tenth aspect, the lengths of the plurality of partial second layers are changed in accordance with the preferable fixing strength, thus the wire-like transmission member can be fixed to the sheet material as firmly as possible, and a weight and cost for materials of the wiring member can be reduced.

According to the eleventh aspect, the wire-like transmission member can be protected by the cover.

BRIEF DESCRIPTION OF DRAWINGS

FIG. 1 A schematic plan view illustrating a wiring member according to an embodiment.

FIG. 2 A schematic cross-sectional view along a II-II line in FIG. 1.

FIG. 3 A schematic cross-sectional view along a III-III line in FIG. 1.

FIG. 4 A partial schematic cross-sectional view along a IV-IV line in FIG. 1.

FIG. 5 A partial schematic plan view illustrating a modification example of an arrangement region of a partial second layer.

FIG. 6 A partial schematic plan view illustrating another modification example of an arrangement region of a partial second layer.

FIG. 7 A partial schematic plan view illustrating still another modification example of the arrangement region of the partial second layer.

FIG. 8 A schematic plan view illustrating a modification example including a cover.

DESCRIPTION OF EMBODIMENT(S)

A wiring member according to an embodiment is described hereinafter. FIG. 1 is a schematic plan view illustrating a wiring member 10, FIG. 2 is a partial schematic cross-sectional view along a II-II line in FIG. 1, FIG. 3 is a partial schematic cross-sectional view along a III-III line in FIG. 1, and FIG. 4 is a partial schematic cross-sectional view along a IV-IV line in FIG. 1.

The wiring member 10 is a member joined to a plurality of components mounted to a vehicle to transmit at least one of electricity or light between the components. The wiring member 10 includes a sheet material 20 and a wire-like transmission member 30 fixed on the sheet material 20. The wire-like transmission member 30 is disposed on a main surface of the sheet material 20, thus the wiring member 10 is formed flatly as a whole. The wiring member 10 may remain in a flat form in a state where the wiring member 10 is assembled to a vehicle, or may be in a bended form in a thickness direction.

The sheet material 20 includes a first layer 22 formed into a sheet-like shape and a second layer 24 provided on a main surface of the first layer 22.

The first layer 22 defines an outer shape of the sheet material 20, and in this point, the first layer 22 is a base material functioning as a base.

The second layer 24 is a layer mediating a bonding of the first layer 22 and the wire-like transmission member 30. That is to say, the second layer 24 is provided on the main surface of the first layer 22, and the wire-like transmission member 30 is fixed to the second layer 24, thus the wire-like transmission member 30 is hardly peeled from the sheet material 20 in a case where the wire-like transmission member 30 is fixed to the second layer 24 compared with a case where the wire-like transmission member 30 is fixed to the first layer 22.

Materials constituting the first layer 22 and the second layer 24 are not particularly limited, but may contain resin such as polyvinyl chloride (PVC), polyethylene (PE), polyethylene terephthalate (PET), and polypropylene (PP), for example. A structure of the base material is not particularly limited, however, a fiber material having fibers such as a woven cloth, a knitting cloth, and a non-woven cloth, for example, may be applicable, and a non-fiber material which does not have fibers such as a member made up by extrusion molding or injection molding. When the base material is a non-fiber material made up by extrusion molding or injection molding, a foam made up by foam molding or a solid material which is not foam-molded but is uniformly solid may also be applicable.

The other layer such a metal layer may be overlapped with the first layer 22 and the second layer 24.

Considering that the first layer 22 has a role as a base of the wiring member 10, it is sufficient that the first layer 22 is excellent in tensile strength than the second layer 24, for example.

Considering that the second layer 24 is the layer mediating the bonding of the first layer 22 and the wire-like transmission member 30, it is sufficient that the second layer 24 is fixed to the wire-like transmission member with larger force than to the first layer 22.

Adoptable as an example of such a combination is a case where the first layer 22 is a non-woven sheet, a woven sheet, and a knitted sheet, and a base resin of resin of the second layer 24 is the same as a base resin of resin constituting a surface of the wire-like transmission member 30.

In this case, when a constituent fiber excellent in the tensile strength is used in the first layer 22, the first layer 22 can be relatively soft and excellent in the tensile strength, thus such a fiber is appropriate as a base material functioning as a base. A minute gap caused by the fiber, for example, is formed in the surface of the first layer 22, thus when the second layer 24 melted by heat, for example, fills the gap, and is then hardened, the first layer 22 and the second layer 24 can be relatively firmly bonded. That is to say, the first layer 22 and the second layer 24 can be relatively firmly bonded by a type of anchor effect. In this case, a melting point of the first layer 22 is higher than that of the second layer 24, thus the second layer 24 is melted to fill the gap of the first layer 22 easily.

In this case, any material can be used as a material constituting the first layer 22 regardless of the resin constituting the surface of the wire-like transmission member 30. For example, when the surface of the wire-like transmission member 30 is formed of polyvinyl chloride (PVC), polypropylene (PP), polyethylene terephthalate (PET), and polyethylene (PE), for example, may be used as the resin constituting the first layer 22.

When the base resin of the resin of the second layer 24 is the same as that constituting the surface of the wire-like transmission member 30, the wire-like transmission member 30 can be relatively firmly bonded to the second layer 24 by welding the wire-like transmission member 30 to the second layer 24, for example. For example, when the base resin of the covering on outer periphery of the wire-like transmission member 30 is PVC, it is sufficient that the base resin of the second layer 24 is PVC.

Also based on an assumption of a case were the wire-like transmission member 30 is fixed to the second layer 24 by an adhesive agent, the adhesive agent generally has favorable adhesion properties on a member having favorable compatibility (affinity), and particularly has favorable adhesion properties on the same system of resin. When the base resin of the resin of the second layer 24 is the same as that constituting the surface of the wire-like transmission member 30, the wire-like transmission member 30 and the second layer 24 can be relatively firmly bonded by using an adhesive agent appropriate for the base resin.

The second layer 24 may be made of resin softer than the first layer 22 as the other example of the above combination.

In this case, the first layer 22 is harder than the second layer 24, thus can be excellent in the tensile strength, for example, and a material suitable as the base material functioning as the base can be selected.

When the second layer 24 is softer than the first layer 22, the wire-like transmission member 30 can be embedded in the second layer 24 to some degree in fixing the wire-like transmission member 30 to the second layer 24, thus a fixing region of the wire-like transmission member 30 in a circumferential direction can be increased. Accordingly, the fixing strength of the wire-like transmission member 30 can be increased.

Flexibility of the first layer 22 and the second layer 24 can be changed by changing a ratio of a plasticizing agent to be added even in a case where a common base resin is used. For example, when the base resin of the first layer 22 and the second layer 24 is PVC and an amount of the plasticizing agent to be added is larger in the second layer 24 than in the first layer 22, the second layer 24 can be softer than the first layer 22. The base resin of the first layer 22 and the second layer 24 may not be PVC, however, PE, PP, and PET, for example, are also applicable. The second layer 24 may also be softened by changing a degree of polymerization of the resin as the base, copolymerizing the other resin, adding a modifier capable of increasing flexibility (for example, olefin system or styrene system thermoplastic elastomer). When the first layer 22 and the second layer 24 are made of a common base resin, the first layer 22 and the second layer 24 can be relatively firmly bonded by melting or an adhesive agent, for example.

The configuration of the second layer 24 is not limited to each example described above, however, any configuration is applicable as long as the fixing strength in fixing the wire-like transmission member 30 to the second layer 24 is higher than that in fixing the wire-like transmission member 30 to the first layer 22.

Herein, the first layer 22 includes a main part 22a and a plurality of (four herein) extension parts 22b to hold the plurality of wire-like transmission members 30 along branched routes.

The main part 22a is formed into an elongated rectangular shape. Each of the plurality of extension parts 22b is formed into an elongated rectangular shape.

The two extension parts 22b extend to one lateral side from both end portions of the main part 22a. The other two extension parts 22b extend to one lateral side from an intermediate portion of the main part 22a in an extension direction. A base end portion of the plurality of extension parts 22b is overlapped with one lateral edge portion of the main part 22a. The base end portion of the plurality of extension parts 22b may also be bonded to one lateral edge portion of the main part 22a by welding, an adhesive agent, and a double-sided tape, for example.

Herein, the plurality of extension parts 22b extend to one lateral side of the main part 22a, however, some of them may extend from the other lateral side. Herein, the plurality of extension parts 22b extend in a direction perpendicular to the main part 22a, but may also extend in an oblique direction with respect to the main part 22a. Lengths of the plurality of extension parts 22b may be the same or different. The extension part 22b may be omitted.

A fixing member 40 is attached to both lateral portions of the base end portion of the extension part 22b overlapping with the main part 22a. The fixing member 40 is a member referred to a clamp or a clip, including a base part 42, a column part 44, and a locking part 46. The base part 42 is formed into a plate-like shape. The column part 44 stand on the base part 42. The locking part 46 is provided on a tip end of the column part 44. The locking part 46 is formed to be able to be inserted into and locked to a hole 52 formed in a fixing target member 50. The locking part 46 is inserted into and locked to the hole 52 formed in the fixing target, thus the fixing member 40 is fixed to the fixing target member 50. The base part 42 functions as a retaining part and the locking part 46 functions as a detent part in the state where the fixing member 40 is fixed to the fixing target member 50. The fixing member 40 is an integrated molded component made of resin by injection molding, for example.

The fixing member 40 is inserted into both lateral portions of the base end portion of the extension part 22b overlapping with the main part 22a. In the state where the fixing member 40 is fixed to the fixing target member, the portion of the base end portion of the extension part 22b overlapping with the main part 22a is fixed between the base part 42 and the fixing target member 50, and the wiring member 10 can be fixed to the fixing member 40.

The base part 22a and the plurality of extension parts 22b described above may be integrally formed.

The second layer 24 includes a plurality of partial second layers 25a, 25b, 26, 27, 28, and 29 provided to be separated from each other along the extension direction of the wire-like transmission member 30.

A region where the partial second layers 25a, 25b, 26, 27, 28, and 29 is provided relates to a position where the wire-like transmission member 30 is provided, thus the wire-like transmission member 30 is described.

It is sufficient that the wire-like transmission member 30 is a wire-like member transmitting electricity or light. For example, the wire-like transmission member 30 may be a general wire having a core wire and an insulating covering around the core wire, or may also be a bare conductive wire, an enamel wire, a nichrome wire, or an optical fiber. The wire-like transmission member 30 transmitting electricity and the wire-like transmission member 30 transmitting light may be arranged in parallel or only one of them may be disposed.

The wire-like transmission member 30 transmitting the electricity may be various kinds of signal lines or various kinds of power lines. The wire-like transmission member 30 transmitting the electricity may be used as an antenna or coil, for example, transmitting or receiving a signal or electrical power to or from a space.

The wire-like transmission member 30 is considered to include a transmission wire body 32 transmitting electricity or light and a covering 34 covering the transmission wire body 32. When the wire-like transmission member 30 is a general wire, for example, the transmission wire body 32 corresponds to a core wire, and the covering 34 corresponds to an insulating covering. The core wire includes one or a plurality of strands. Each strand is formed of a conductive material such as copper, copper alloy, aluminum, and aluminum alloy, for example. When the core wire is made up of the plurality of strands, the plurality of strands are preferably stranded. The insulating covering is formed of a resin material such as PVC or PE extrusion-molded around the core wire.

The sheet material 20 and the wire-like transmission member 30 are fixed to each other. The sheet material 20 and the wire-like transmission member 30 are fixed to each other by a contact area fixation. The contact area fixation indicates that a portion where the sheet material 20 and the wire-like transmission member 30 have contact with each other is stuck and fixed.

Applicable as the configuration of the contact area fixation are a contact area indirect fixation and a contact area direct fixation, or both fixations may also be used together in different regions. Herein, the contact area indirect fixation indicates that the sheet material 20 and the wire-like transmission member 30 are indirectly stuck and fixed via an adhesive agent, for example, provided therebetween. The contact area direct fixation indicates that the sheet material 20 and the wire-like transmission member 30 are directly stuck and fixed without an intervention of the adhesive agent, for example, which is separately provided. Considered in the contact area direct fixation is that resin included in at least one of the sheet material 20 and the wire-like transmission member 30 is melted, thus the sheet material 20 and the wire-like transmission member 30 are stuck and fixed, for example. In the description hereinafter, the sheet material 20 and the wire-like transmission member 30 are in the state of the contact area direct fixation.

In forming the state of such a contact area direct fixation, the resin is considered to be melted by heat or a solvent, for example. That is to say, the state of the contact area direct fixation may be the state of the contact area direct fixation by the heat or the state of the contact area direct fixation by the solvent. The contact area direct fixation by the heat is preferable.

At this time, a means of forming the state of the contact area direct fixation is not particularly limited, but a known means such as welding, fusion, and melting joint can be used. For example, when the state of the contact area direct fixation by the heat is formed by welding, various welding means such as ultrasonic welding, heating-pressurizing welding, hot air welding, and high frequency welding can be adopted. When the state of the contact area direct fixation is formed by these means, the sheet material 20 and the wire-like transmission member 30 are in the state of the contact area direct fixation by these means. Specifically, when the state of the contact area direct fixation is formed by the ultrasonic welding, for example, the sheet material 20 and the wire-like transmission member 30 are in the state of the contact area direct fixation by the ultrasonic welding.

In the case of the contact area direct fixation, only one of the resin included in the sheet material 20 and the resin included in the covering 34 of the wire-like transmission member 30 may be melted, or both of them may be melted. In the former case, the resin which has been melted is stuck on an outer surface of the resin which has not been melted, and a relatively clear interface may be formed in some cases. In the latter case, there may be a case where both the resins are mixed and a clear interface is not be formed. Particularly, when the covering 34 of the wire-like transmission member 30 and the sheet material 20 include compatible resin such as the same resin material, for example, there may be a case where both the resins are mixed and a clear interface is not be formed.

Herein, the wiring member 10 includes a plurality of wire-like transmission members 30. The plurality of wire-like transmission members 30 are wired on the first layer 22 in the following configuration.

That is to say, intermediate portions of the plurality of wire-like transmission members 30 in the extension direction are disposed along the main part 22a of the first layer 22. Each of the end portions of the plurality of wire-like transmission members 30 is bended at a position of any extension part 22b and disposed along the corresponding extension part 22b.

Some of the plurality of wire-like transmission members 30 are branched from the other wire-like transmission members 30 at a position corresponding to the two extension parts 22b closer to the intermediate portion of the main part 22a in the plurality of extension parts 22b. In this portion, some of the wire-like transmission members 30 are disposed to be bended and directed to the extension part 22b. Some of the wire-like transmission members 30 are disposed to intersect with the other wire-like transmission member 30 and be directed to the extension part 22b (refer to an intersection position 31 in FIG. 1). Some of the plurality of wire-like transmission members 30 are disposed to be bended at the end portion of the main part 22a and directed to the extension part 22b in the end portion of the main part 22a.

Each end portion of the plurality of wire-like transmission members 30 is connected to a connector 60 at the end portion of the extension part 22b. When the wire-like transmission member 30 is an electrical wire, the connector 60 is an electrical connector in which a terminal connected to an end portion of the electrical wire is housed in a connector housing. When the connector 60 is connected to a connector of the other side component, a plurality of components are electrically connected or connected to transmit and receive an optical signal via the wire-like transmission member 30.

The plurality of partial second layers 25a, 25b, 26, 27, 28, and 29 of the second layer 24 are provided to be separated from each other along the extension direction of the wire-like transmission member 30 described above. Herein, each of the partial second layers 25a, 25b, 26, 27, 28, and 29 is formed into a quadrangular shape, however, the other shape such as a circular shape and a polygonal shape (triangular shape and pentagonal shape, for example) is also applicable. Each of the partial second layers 25a, 25b, 26, 27, 28, and 29 has a width large enough to fix all of the plurality of wire-like transmission members 30 passing through a partial region in the partial region in the extension direction of the main part 22*a* or the extension part 22*b* in the partial region. However, it is also applicable that each of the partial second layers 25*a*, 25*b*, 26, 27, 28, and 29 has a width large enough to fix part of the plurality of wire-like transmission members 30 passing through a partial region in the extension direction of the main part 22*a* or the extension part 22*b* in the partial region.

The partial second layers 25*a* and 25*b* are provided in a region keeping a state where the plurality of wire-like transmission members 30 are branched.

In this manner, at least one wire-like transmission member 30 is bended in a position where the plurality of wire-like transmission members 30 are branched. Thus, the partial second layers 25*a* and 25*b* are provided in a region including a position where the wire-like transmission member 30 is bended in the branch part. Herein, the partial second layers 25*a* and 25*b* are provided not only in a region corresponding to the wire-like transmission member 30 bended in the branch position but also in a region corresponding to the wire-like transmission member 30 provided straight. That is to say, in each position where the plurality of wire-like transmission members 30 are branched, one partial second layer 25*a* (or 25*b*) is provided in a region corresponding to the bended wire-like transmission member 30 and the wire-like transmission member 30 disposed straight.

The partial second layer 25*a* is provided in a region where the plurality of wire-like transmission members 30 intersect with each other. That is to say, in the position where the plurality of wire-like transmission members 30 are branched, there is a case where at least one wire-like transmission member 30 intersects with the other wire-like transmission member 30 (refer to the intersection position 31). The partial second layer 25*a* is provided in a region where the plurality of wire-like transmission members 30 intersect with each other in the branch part. Thus, the second layer 25*a* is fixed to the wire-like transmission members 30 intersecting with each other in the intersection position 31 in a position where the second layer 25*a* sandwiches the intersection position 31.

Described herein is an example the intersection position 31 is generated in the position where the plurality of wire-like transmission members 30 are branched. However, the plurality of wire-like transmission members 30 may intersect with each other in a portion other than the branch position for a purpose of switching an order of arrangement in accordance with an arrangement of terminals of connectors, for example. The partial second layer may also be provided in a region where the plurality of wire-like transmission members 30 intersect with each other in a portion other than the branch position.

The partial second layer 26 is provided in a region keeping a state where the wire-like transmission member is bended.

Herein, the plurality of wire-like transmission members 30 are bended in both end portions of the main part 22*a*, and the partial second layer 26 is provided in a region keeping a state where the plurality of wire-like transmission members 30 are bended in the both end portions of the main part 22*a*.

Assumable as the region keeping the state where the plurality of wire-like transmission members 30 are bended is a region including the position where the wire-like transmission member 30 is bended itself. Accordingly, the bended part itself in the wire-like transmission member 30 is held by the partial second layer 26 along a predetermined route on the first layer 22. Herein, each partial second layer 26 fixes the bended position of the plurality of wire-like transmission members 30 to the first layer 22.

In the example illustrated in FIG. 1, the partial second layer 26 is formed into a shape extending to the position where the plurality of wire-like transmission members 30 are bended and a position adjacent to the position where the plurality of wire-like transmission members 30 are bended. However, as illustrated in FIG. 5, the partial second layer 126 may be provided in a local region centering on the position where the plurality of wire-like transmission members 30 are bended.

The region keeping the state where the plurality of wire-like transmission members 30 are bended needs not necessarily include the position where the wire-like transmission member 30 is bended. For example, as illustrated in FIG. 6, the pair of partial second layers 226 may be provided on both sides of the position where the wire-like transmission member 30 is bended along the route of the wire-like transmission member 30. The pair of partial second layers 226 keep a posture of the wire-like transmission member 30 constant on the both sides of the position where the wire-like transmission member 30 is bended, thus the bended state of the wire-like transmission member 30 is also kept constant.

The partial second layer 27 is provided on a terminal portion of the sheet material 20, that is a terminal portion of the extension part 22*b* herein. The partial second layer 26 may be provided to have contact with an edge of the terminal of the extension part 22*b*, or may also be provided in a position 1 cm or less away from the edge of the terminal of the extension part 22*b*.

The partial second layer 28 is provided in a region where the plurality of wire-like transmission members 30 are not branched or bended but extend straight in the main part 22*a*.

The partial second layer 29 is provided in a region where the plurality of wire-like transmission members 30 are not branched or bended but extend straight in the extension part 22*b*.

The plurality of wire-like transmission members 30 are fixed to the partial second layers 25*a*, 25*b*, 26, 27, 28, and 29 by relatively large force in regions where the partial second layers 25, 25*b*, 26, 27, 28, and 29 are provided (refer to FIG. 2).

The plurality of wire-like transmission members 30 are not fixed to the sheet material 20 in the region where the partial second layers 25*a*, 25*b*, 26, 27, 28, and 29 are not provided (refer to FIG. 3). The wire-like transmission member 30 may be fixed to the first layer 22 also in a region in the sheet material 20 where the partial second layers 25*a*, 25*b*, 26, 27, 28, and 29 are not provided.

The sheet material 20 described above can be manufactured by bonding the partial second layers 25*a*, 25*b*, 26, 27, 28, and 29 partially formed in a predetermined shape in advance to a material constituting the first layer 22, for example.

According to the wiring member 10 having such a configuration, the wire-like transmission member 30 can be fixed to the sheet material 20 as firmly as possible by the second layer 24. The second layer 24 includes the plurality of partial second layers 25*a*, 25*b*, 26, 27, 28, and 29 formed to have a configuration of being separated from each other along the extension direction of the wire-like transmission member 30, thus a weight and cost for materials of the wiring member 10 can be reduced compared with the case where the second layer is provided on the whole main surface of the sheet material 20.

The wire-like transmission members 30 are bended or intersect with each other in the branch part of the wire-like transmission members 30, thus there is a possibility that the fixing strength of the wire-like transmission members 30 fixed to the sheet material 20 is reduced. The partial second layers 25a and 25b are provided in the region keeping the state where the plurality of wire-like transmission members 30 are branched, thereby being able to keep the state where the plurality of wire-like transmission members 30 are branched, thus the wire-like transmission member 30 can be effectively fixed to the sheet material 20.

Particularly, the partial second layers 25a and 25b are provided in the portions where the plurality of wire-like transmission members 30 are bended in the branch positions, thus the state where the plurality of wire-like transmission member 30 are bended in the branch parts can be effectively kept.

In the intersection position 31 of the plurality of wire-like transmission members 30, the wire-like transmission member 30 on the side away from the sheet material 20 has a small fixing region fixed to the sheet material 20. The partial second layer 25a is provided in the region where the plurality of wire-like transmission members 30 intersect with each other, thus the state where the plurality of wire-like transmission members 30 intersect with each other can be effectively kept.

There is a possibility that force of the wire-like transmission member 30 recovering the original shape acts in the position where the plurality of wire-like transmission members 30 are bended. The partial second layer 26 is provided in the region where the wire-like transmission member 30 is bended, thus the state where the wire-like transmission member 30 is bended can be effectively kept.

Particularly, the partial second layers 26 and 126 are provided in the regions where the wire-like transmission member 30 is bended, thus the state where the wire-like transmission member 30 is bended can be effectively kept.

Also in the case where the partial second layers 226 are provided on both sides of the position where the wire-like transmission member 30 is bended, the portions on both sides of the position where the wire-like transmission member 30 is bended can be kept in a constant posture, thus the bended state of the wire-like transmission member 30 can be effectively kept.

There is a possibility that force in a direction of peeling the wire-like transmission member 30 from the sheet material 20 acts in the terminal portion of the sheet material 20 when the connector 60 is moved, for example. The partial second layer 27 is provided in the terminal portion of the sheet material 20, thus the area ranging from the wire-like transmission member 30 to the terminal portion of the sheet material 20 can be firmly held.

Lengths of the partial second layers 25a, 25b, 26, 27, 28, and 29 may be the same or different in the direction along the extension direction of the sheet material 20 (the extension direction of the main part 22a and the extension direction of the extension part 22b). The lengths of the partial second layers 25a, 25b, 26, 27, 28, and 29 may be larger in a position of at least one of the branch position, the branch position, and the terminal portion of the wire-like transmission members 30 than the position where the wire-like transmission member 30 is held in the straight state. In the example illustrated in FIG. 1, the length of the partial second layer 26 disposed in the bended position of the wire-like transmission member 30 is set larger than those of the partial second layers 28 and 29 disposed in the straight position of the wire-like transmission member 30. Accordingly, the lengths of the plurality of partial second layers 25a, 25b, 26, 27, 28, and 29 are changed in accordance with the preferable fixing strength, thus the wire-like transmission member 30 can be fixed to the sheet material 20 as firmly as possible, and a weight and cost for materials of the wiring member 10 can be reduced.

When the lengths of the partial second layers are different, they may be changed in at least two levels, but may also be changed in multiple levels. When widths of the plurality of partial second layers 25a, 25b, 26, 27, 28, and 29 are the same, the change in the lengths of the plurality of partial second layers 25a, 25b, 26, 27, 28, and 29 is synonymous with a change in areas of the partial second layers 25a, 25b, 26, 27, 28, and 29. The width of the partial second layer may also be changed by the number and intervals between the wire-like transmission members 30 to be held.

The intervals between the plurality of partial second layers in the direction along the extension direction of the wire-like transmission member 30 may the same or different.

FIG. 7 illustrates an example of changing intervals between a plurality of partial second layers 325 and 326 in the direction along the extension direction of the wire-like transmission member 30.

FIG. 7 illustrates a schematic plan view of a part of a wiring member 310 according to a modification example.

In the wiring member 310, a first layer 322 of the sheet material 320 includes an arc band-like part 322a and a straight band-like part 322b extending from both ends of the arc band-like part 322a. The plurality of wire-like transmission members 30 are disposed along an extension direction of the first layer 322. The plurality of wire-like transmission members 30 extend from one straight band-like part 32b to be connected to a connector 360.

The second layer 324 includes the plurality of partial second layers 325 and 326. The plurality of partial second layers 325 are provided on the arc band-like part 322a, and the plurality of partial second layers 326 are provided on the straight band-like part 322b. The interval between the plurality of partial second layers 325 and the interval between the partial second layer 325 and the partial second layer 326 adjacent thereto in the arc band-like part 322a is smaller than the interval between the plurality of partial second layers 326 in the straight band-like part 322b.

The partial second layers 325 and 326 are provided at a relatively close interval in the position where the plurality of wire-like transmission members 30 are bended and a surrounding region thereof, thus the state where the wire-like transmission members 30 are bended can be effectively kept. In the meanwhile, the partial second layers 326 are provided at a relatively large interval in the position where the plurality of wire-like transmission members 30 are disposed straight, thus the weight and cost for materials of the wiring member 10 can be reduced.

The partial second layer may be provided closer to each other in the position where the plurality of wire-like transmission members 30 are branched or the terminal portion, for example, than in the other portion. Also in FIG. 7, the two partial second layer 326 are provided at a relatively closer interval in the terminal portion than in the other portion.

When the intervals between the partial second layers are different, it may be changed in at least two levels, but may also be changed in multiple levels.

In a wiring member 410 according to a modification example illustrated in FIG. 8, the partial second layers 25a, 25b, and 26 protrude to a lateral side of the wire-like transmission member 30 and are provided on the first layer 22. Herein, the plurality of wire-like transmission members 30 are disposed in a parallel state in the partial second layers 25a, 25b, and 26, and the partial second layers 25a, 25b, and 26 protrude to an outer side in relation to the wire-like transmission members 30 located on both end sides.

A cover 420 is attached to the sheet material 20 to cover at least part of the wire-like transmission member 30 via the portion of the partial second layers 25a, 25b, and 26 protruding to the lateral side of the wire-like transmission member 30. Herein, the cover 420 attached to the partial second layers 25a and 25b covers the branch position of the wire-like transmission members 30. The cover 420 attached to the partial second layer 26 covers the bended position of the wire-like transmission members 30.

The partial second layers 25a, 25b, and 26 have the configuration suitable for fixing the wire-like transmission member 30, thus when the cover 420 is made of the same material as a constituent resin around the wire-like transmission member 30, for example, the cover 420 can be fixed to the first layer 22 relatively firmly via the partial second layers 25a, 25b, and 26.

Accordingly, the wire-like transmission member 30 can be firmly fixed to the sheet material 20 by the partial second layers 25a, 25b, and 26 in the position in the wire-like transmission member 30 where the relatively firm fixation is necessary, and this configuration is also suitable for attaching the cover 420 to the sheet material 20 with covering the wire-like transmission member 30.

The cover may cover the wire-like transmission member 30 with a larger region. For example, the cover may cover the wire-like transmission member 30 on the whole sheet material 20, for example.

Modification Example

Each configuration described in the embodiments and modification examples thereof can be appropriately combined as long as they are not contradictory.

For example, in the above embodiment, the main part 22a or the extension part 22b may be curved to have an arc-like shape. It is also applicable that the modification example illustrated in FIG. 5 and the modification example illustrated in FIG. 6 are combined to constitute the partial second layer in the bended part and both sides of the bended part of the wire-like transmission member 30. The cover may be provided in the example illustrated in FIG. 7.

Although the present invention is described in detail, the foregoing description is in all aspects illustrative and does not restrict the invention. It is therefore understood that numerous modifications and variations can be devised without departing from the scope of the invention.

EXPLANATION OF REFERENCE SIGNS 10, 310, 410 wiring member
20, 320 sheet material
22, 322 first layer
24, 324 second layer
25a, 25b, 26, 27, 28, 29, 126, 226, 326 partial second layer
30 wire-like transmission member
31 intersection position
420 cover

The invention claimed is:

1. A wiring member, comprising:
a sheet material including a first layer formed into a sheet-like shape and a second layer provided on a main surface of the first layer; and
a wire-like transmission member fixed on the sheet material, wherein
the second layer mediates a bonding of the first layer and the wire-like transmission member, and includes a plurality of partial second layers provided to be separated from each other along an extension direction of the wire-like transmission member,
the wire-like transmission member includes a plurality of wire-like transmission members fixed in a branch state on the sheet material,
the partial second layers include a first partial second layer provided in a region keeping a state where the plurality of wire-like transmission members are branched such that the first partial second layer extends to be sheet-like in a portion where the plurality of wire-like transmission members protrude in multiple directions,
a portion of the first partial second layer is in a state of being exposed, the portion of the first partial second layer being a surface opposite to the first layer and between the plurality of wire-like transmission members, and
at least a top of the plurality of wire-like transmission members is in a state of being exposed on the first partial second layer and the portion of the first partial second layer in the state of being exposed is positioned lower than the top of the plurality of wire-like transmission members.

2. The wiring member according to claim 1, wherein the first partial second layer is provided in a region where the plurality of wire-like transmission members are bended in a branch part of the wire-like transmission members.

3. The wiring member according to claim 1, wherein a part of the wire-like transmission member is fixed on the sheet material in a bended state, and the plurality of partial second layers include a third partial second layer provided in a region to maintain the wire-like transmission member in the bended state.

4. The wiring member according to claim 3, wherein the plurality of partial second layers include fourth partial second layers provided on both sides of a position where the wire-like transmission member is bended.

5. The wiring member according to claim 1, wherein the plurality of partial second layers include a fifth partial second layer provided in a terminal portion of the sheet material.

6. The wiring member according to claim 1, wherein intervals between the plurality of partial second layers in a direction along the extension direction of the wire-like transmission member are different.

7. The wiring member according to claim 1, wherein lengths of the plurality of partial second layers in a direction along an extension direction of the sheet material are different.

8. The wiring member according to claim 1, wherein the partial second layers include a sixth partial second layer protruding to a lateral side of the wire-like transmission member to be provided on the main surface of the first layer, and the wiring member further comprises a cover attached to the sheet material to cover a part of the wire-like transmission member via a portion of the sixth partial second layer provided to protrude to the lateral side of the wire-like transmission member.

9. A wiring member, comprising:

a sheet material including a first layer formed into a sheet-like shape and a second layer provided on a main surface of the first layer; and a wire-like transmission member fixed on the sheet material, wherein the second layer mediates a bonding of the first layer and the wire-like transmission member, and includes a plurality of partial second layers provided to be separated from each other along an extension direction of the wire-like transmission member, the wire-like transmission member includes a plurality of wire-like transmission members intersecting with each other, the plurality of partial second layers include a second partial second layer provided in a region where the plurality of wire-like transmission members are intersect with each other such that the second partial second layer extends to be sheet-like in the region including an intersection position of the plurality of wire-like transmission members and positions sandwiching the intersection position therebetween where the wire-like transmission members passing the intersection position are fixed, a portion of the second partial second layer is in a state of being exposed, the portion of the second partial second layer being a surface opposite to the first layer and between the plurality of wire-like transmission members, and at least a top of the plurality of wire-like transmission members is in a state of being exposed on the second partial second layer and the portion of the second partial second layer in the state of being exposed is positioned lower than the top of the plurality of wire-like transmission members.

10. The wiring member according to claim 9, wherein a part of the wire-like transmission member is fixed on the sheet material in a bended state, and the plurality of partial second layers include a third partial second layer provided in a region to maintain the wire-like transmission member in the bended state.

11. The wiring member according to claim 10, wherein the plurality of partial second layers include fourth partial second layers provided on both sides of a position where the wire-like transmission member is bended.

12. The wiring member according to claim 9, wherein the plurality of partial second layers include a fifth partial second layer provided in a terminal portion of the sheet material.

13. The wiring member according to claim 9, wherein intervals between the plurality of partial second layers in a direction along the extension direction of the wire-like transmission member are different.

14. The wiring member according to claim 9, wherein lengths of the plurality of partial second layers in a direction along an extension direction of the sheet material are different.

15. The wiring member according to claim 9, wherein the partial second layers include a sixth partial second layer protruding to a lateral side of the wire-like transmission member to be provided on the main surface of the first layer, and the wiring member further comprises a cover attached to the sheet material to cover a part of the wire-like transmission member via a portion of the sixth partial second layer provided to protrude to the lateral side of the wire-like transmission member.

16. A wiring member, comprising:

a sheet material including a first layer formed into a sheet-like shape and a second layer provided on a main surface of the first layer; and a wire-like transmission member fixed on the sheet material, wherein the second layer mediates a bonding of the first layer and the wire-like transmission member, and includes a plurality of partial second layers provided to be separated from each other along an extension direction of the wire-like transmission member, a part of the wire-like transmission member is fixed on the sheet material in a bended state, the plurality of partial second layers include a third partial second layer provided in a region to maintain the wire-like transmission member in the bended state such that the third partial second layer extends to be sheet-like in the region including a bending position of the wire-like transmission member and a position next to the bending position where the wire-like transmission member is fixed, the wire-like transmission member includes a plurality of wire-like transmission members in the bended state, a portion of the third partial second layer is in a state of being exposed, the portion of the third partial second layer being a surface opposite to the first layer and between the plurality of wire-like transmission members, and at least a top of the plurality of wire-like transmission members is in a state of being exposed on the third partial second layer and the portion of the third partial second layer in the state of being exposed is positioned lower than the top of the plurality of wire-like transmission members.

17. The wiring member according to claim 16, wherein the plurality of partial second layers include fourth partial second layers provided on both sides of a position where the wire-like transmission member is bended.

18. The wiring member according to claim 16, wherein the plurality of partial second layers include a fifth partial second layer provided in a terminal portion of the sheet material.

19. The wiring member according to claim 16, wherein intervals between the plurality of partial second layers in a direction along the extension direction of the wire-like transmission member are different.

20. The wiring member according to claim 16, wherein lengths of the plurality of partial second layers in a direction along an extension direction of the sheet material are different.

* * * * *